United States Patent
Marx et al.

(10) Patent No.: US 7,810,338 B2
(45) Date of Patent: Oct. 12, 2010

(54) CONTROL METHOD FOR THE AIR-CONDITIONING TREATMENT OF PRODUCTS

(76) Inventors: Siegfried Marx, Erdberger Lände 22/20, Wien (AT) A-1030; Martin Marx, Hauptstrasse 30, Mittlern (AT) A-9125

( * ) Notice: Subject to any disclaimer, the term of this patent is extended or adjusted under 35 U.S.C. 154(b) by 924 days.

(21) Appl. No.: 11/572,113

(22) PCT Filed: Jul. 13, 2005

(86) PCT No.: PCT/AT2005/000266

§ 371 (c)(1), (2), (4) Date: Feb. 1, 2007

(87) PCT Pub. No.: WO2006/007617

PCT Pub. Date: Jan. 26, 2006

(65) Prior Publication Data

US 2008/0009981 A1    Jan. 10, 2008

(30) Foreign Application Priority Data

Jul. 16, 2004  (AT)  ................. A 1210/2004
Dec. 21, 2004  (AT)  ................. A 2128/2004
Dec. 21, 2004  (AT)  ................. A 2129/2004
Dec. 21, 2004  (AT)  ................. A 2130/2004

(51) Int. Cl.
*F25D 25/00*    (2006.01)
*F25B 49/00*    (2006.01)
(52) U.S. Cl. ................. 62/62; 62/127; 62/176.6
(58) Field of Classification Search ................. 62/62, 62/63, 126, 127, 129, 176.6, 157, 231
See application file for complete search history.

(56) References Cited

U.S. PATENT DOCUMENTS

| 5,369,567 A | 11/1994 | Furuta et al. |
| 6,168,085 B1 | 1/2001 | Garcia |
| 6,434,951 B2 * | 8/2002 | Later .......................... 62/64 |
| 2003/0172663 A1 * | 9/2003 | Cartwright et al. ............ 62/126 |
| 2008/0115511 A1 * | 5/2008 | Barone et al. .................. 62/62 |

FOREIGN PATENT DOCUMENTS

| DE | 3334875 A1 | 4/1985 |
| DE | 19951627 A1 | 7/2000 |
| EP | 0429947 A | 6/1991 |
| EP | 1211913 A | 6/2002 |

* cited by examiner

*Primary Examiner*—Marc E Norman
(74) *Attorney, Agent, or Firm*—David A. Guerra (57) ABSTRACT

A control method for the air-conditioning treatment of products cyclically measures, at definable time intervals, the product temperature and, according thereto, automatically adjusts several environmental parameters inside the treatment chamber. In order to provide a process that is automatic and gentle and to save energy and time in comparison to conventional methods, actual values for a characteristic temperature of the product, the temperature of the air inside the treatment chamber and the temperature of the incoming air are measured in each cycle. At least at the beginning of the treatment process, the desired final state of the product is defined based on characteristic parameters, and set values for the measured parameters for the next cycle are automatically determined from the measured and defined parameters and, in the next measuring cycle, are compared with the respective actual values.

19 Claims, 5 Drawing Sheets

CONTROL METHOD FOR THE AIR-CONDITIONING TREATMENT OF PRODUCTS

BACKGROUND OF THE INVENTION

The invention relates to a control method for the air-conditioned treatment of products, wherein a characteristic temperature of the product is measured cyclically at definable time intervals and according to which several environmental parameters are adjusted automatically in the treatment chamber.

The air-conditioned treatment of products may be applied in many different ways and may be applied to a great variety of products. This may range from relatively simple defrosting or intensive cooling down to drying, for example of wood, but also of foodstuffs such as, for example, sausages and meat, and may extend to maturing and smoke-curing of foodstuffs.

With defrosting one distinguishes between natural defrosting and defrosting by air-conditioning, the latter being performed by various methods such as, for example, fresh air—circulating air—exhaust air-defrosting in conjunction with defrosting using heat pumps or in the form of vacuum defrosting by means of various energy carriers such as, for example, steam, directly or indirectly by heat exchangers or expensive electric heating etc. In all methods known to date, the control is performed, in each case, as a function of the temperature and the relative humidity in the circulating air of the air system, as a result of which the product, depending on the type of product, is defrosted in a time controlled manner. Intensive cooling is likewise performed in a comparable manner in most cases, the control in this case, however, being adjusted according to the core temperature of the product and the ambient temperature.

In the field of treating raw meat or raw sausages, for example, which are to be brought to a biologically desired degree of drying and/or ripening, natural maturing (drying), conventionally used over a long time, has been replaced by air-conditioned maturing, since this permits, regardless of the existing climatic conditions to manufacture raw sausages, for example, in appropriate maturing plants, regardless of the natural conditions. In known conventional modern maturing plants, based on long-established experimental values, programmed maturing may be carried out through precise time controlled setting of all maturing processes. Various methods are used in this context, which aim to exploit or influence certain conditions in the course of maturing of foodstuffs.

The preparation of various foodstuffs, such as, for example, sausages and cheese, requires a maturing treatment, during which the foodstuffs are subjected, for a predetermined duration, to certain temperatures and degrees of air humidity. After filling natural or artificial skins with the basic mixture, sausages are suspended in transport carriages, removed to maturing chambers and subjected to a drying treatment in these drying chambers. Thus, DE 33 19 528 C2 describes a method for maturing and drying sausage or similar foodstuffs, wherein the product to be treated is deprived of water by supplying conditioned air until the desired degree of drying and maturing has been attained and wherein, during treatment of the product, its pH value is determined and used as a reference for treating the product. In this method the pH value of a pilot object is measured continuously in the treatment chamber while the temperature is controlled continuously in the treatment chamber according to the measured pH value, in which context, at the beginning of the treatment, a temperature of the magnitude of 24° C. is used for pH values of about 5, 8 of the product to be treated, which temperature is lowered continuously to a temperature of about 20° C. when the pH value decreases to about 5, 3. This method is limited exclusively to the measurement of the pH value, which is used to control the temperature in the respective treatment/maturing chamber. No further factors contribute to this control method.

From DE 42 43 656 C2 a process has become known for treating smoked products, in particular meat and sausages, using a mixture of air and a water-soluble liquid, called liquid smoke, having a smoky odor and taste, which is sprayed into the air of the smoking chamber. This process is characterized by the fact that pure liquid smoke is sprayed directly into the air sucked from a smoking chamber into a separate mixing region, swirled in this mixing region by increasing the pressure and subsequently returned to the smoking chamber. This process for treating sausages serves both for maturing, but in particular for a thermal treatment in order to develop particular taste nuances, influencing the maturing process only to a limited extent.

From DE 195 11 223 A1 a process for maturing foodstuffs, for raw sausages as well, has become known, wherein the foodstuffs are stored in a sealed treatment chamber at controlled room temperature and room humidity until the desired degree of maturing has been attained. From a storage tank a gas or gas mixture is fed to the treatment chamber, having a content of inert gas considerably higher than air. By controlling the gas or gas mixture supply, a residual oxygen content in the treatment chamber, adapted to the maturing process, is to be adjusted. Such a climatic chamber process requires considerable efforts in preparing and providing a suitable gas or gas mixture, this process likewise influencing only certain process steps for maturing foodstuffs.

Furthermore, processes are known, wherein the weight reduction of the products to be treated are used as control parameters for the maturing process, so described in DE 35 37 373 A1, and also a process for maturing and drying raw sausages by adjusting the aw-value, as known from DE 43 26 688 C2. These known processes as well are based only on individual process parameters for treating and maturing raw sausages, other influencing parameters are, for the most part, not taken into account.

It may thus be generally stated that raw sausages, by extraction of water, lowering of the pH value, temperature control of the process as well as material-specific properties, influenced by recipes and/or their distribution may be prepared into firm dry sausages by means of internal and external process steps. The external process steps remove the water from the sausages by temperature control, time control and control of the degree of humidity, form the basis for the internal microbiological processes and influence the process sequence as a whole by material preparation, additives and recipes. The external parameters relate to the relative or absolute humidity of the air, the air velocity and the temperatures influencing the internal process steps. Thus, in order to control the humidity, mostly relative humidity, the air is dehumidified by cooling. This air is dried, heated in a further process and water being added in order to control the degree of drying off. This brings about the desired degree of relative humidity in the air, the air being transported through the maturing chamber/smoking chamber by ventilators, for example. The air velocity and its parameters must in this case always correspond to the drying-up or water discharge conditions of the product in order to avoid dry edges in the raw sausage to be matured. A second form of control of the air parameters assumes that the air already has a certain degree of humidity, which only needs to be adjusted still to the water discharge conditions of the products. This can be attained in that the property of the product to release water by applying a circulating air pattern with fresh air supply at certain intervals is used for controlling the degree of humidity. The process steps of water removal with intensive air cooling and renewed humidifying are in this case mostly dispensed with due to an external process control of the air parameters.

This method assumes that preceding minimal cooling standardizes the humidity content in the air to a certain temperature. It must be considered in this context that the seasons alone do in this case not ensure constant conditions. In addition it must be noted that the raw sausage, being a water dispenser, covers the additional moisture content requirements when the temperature increases. Both air constancy and product behavior have considerably more variables so that the technically simple rule has an effect only in a limited manner for a certain product under defined external air conditions, but cannot fulfill the more general, substantially broader process without defective products, it being possible for dried out edges to occur due to excessive water removal as a result of a lack of water vapor or also an excess thereof with sweating phenomena. Sweating phenomena of the sausages are thus responsible for the fact that particularly in the starting phase of the process a high increase of the germ growth of bacteria and the oxygen-based germ flora is recorded.

In the treatment of wood, finally, one distinguishes between natural drying as well as air-conditioned drying, the air-conditioned drying being able to be performed according to various processes, such as, for example:

a) Fresh air—exhaust air drying (conventional wood drying)

b) Drying with heat pumps (condensation principle)

c) Vacuum drying

All of these variations may in this context be used in various mechanical/technical types of design. In all processes known to date the control takes place in each case according to the relative humidity in the circulating air, which is called equilibrium moisture content of the wood, as a result of which the wood, depending on the type, is dried in a time controlled manner.

EP 429 947 describes a control method for drying wood, wherein, as stated at the outset, only the wood temperature, as the sole measured reference value, is determined at definable time intervals and the air temperature as well as the air humidity in the drying chamber are adjusted on that basis. These last two parameters are coupled "harder" or "softer" to the reference variable of the current wood temperature by proportionality factors which may likewise be introduced manually.

DE 199 51 627 shows likewise a process and an apparatus for drying, in particular of wood, wherein an excess pressure is set in the drying chamber, but which purely serves for setting up or maintaining an air flow in the system and is of secondary importance to the drying. The type of control and the type of the reference variables used therefore is not disclosed.

The object of the present invention was a control method of the type set out in the opening paragraph, wherein, according to the determination of the final parameters of the desired final state of the respective product, the treatment process proceeds automatically and gently, all product factors as well as the external factors being adjusted as optimal as possible for the fast, gentle, but nevertheless energy- and time-saving treatment as compared with conventional methods.

In order to attain this object, the control method according to the invention is characterized in that in each cycle actual values for the characteristic temperature of the product, the temperature of the air inside the treatment chamber and the temperature of the feed air as well as for the moisture content of the product are measured, that at least at the beginning of the treatment process the desired final state of the product is defined on the basis of characteristic parameters, that from the measured and defined parameters set values for the measured parameters are automatically determined for the next cycle and are compared with the respective actual values in the next measuring cycle. The new invention is characterized in that with low energy input, in conjunction with a constantly adapting air compression, a uniform distribution of the air in the entire region around the product to be treated and thus a faster uniform heating or cooling of the product is attained. Besides, no additional humidification by injecting water vapor and also no dehumidification through low temperature registers are required. The period of time to attain the required characteristic temperature, preferably the core temperature of the respective product, depends on the initial temperature and further product parameters, for example the thickness of the wood to be dried as well as the water content in the core up to the edge, and comes about automatically as a function of these product properties.

An advantageous embodiment provides that further derived actual parameters are determined from the actual values for the characteristic temperature of the product, the temperature of the air in the treatment chamber and the temperature of the feed air, as well as for the moisture content of the product and that from several measured and derived parameters as well as from the defined parameters set values are automatically determined for these measured and derived parameters for the next cycle and are compared with the respective actual values in the next measure cycle. Control methods of this type permit a particularly advantageous operation of defrosting chambers.

For the intensive cooling of products, the drying of wood, but also the maturing and/or drying treatment of foodstuffs a control method is particularly advantageous which, according to a further characteristic of the invention, is characterized in that the humidity of the feed and exhaust air of the treatment chamber is measured as well and that for the latter automatic set values are determined for the next cycle as well, which are compared with the respective actual values in the next measuring cycle.

In this case as well, it may advantageously be provided that also from the humidity of the feed and exhaust air further derived actual parameters are determined and that for the latter as well automatic set values are determined for the next cycle which are compared with the respective actual values in the next measuring cycle.

Advantageously, in all methods according to any one of the preceding paragraphs the air pressure inside the treatment chamber is adjusted. As long as the process step is performed at the preset core temperature, the air pressure around the product will in this case normally be higher than at the core, so that premature drying out around the edge of the product is prevented and the actual water withdrawal starts after the optimal characteristic temperature has been attained.

According to a further characteristic of the invention the vapor pressure of the air inside the treatment chamber may also be adjusted.

Preferably, the moisture content, at least of the product, is determined by its conductivity.

If, according to a further embodiment of the invention, the temperature of the returned air from the treatment chamber is adjusted, this permits to influence the conditions in the treatment chamber in an optimal energy- and control-technical manner.

In order to ensure the best possible energy efficiency of the control method according to the invention, a further advantageous embodiment provides that heat or cold is recovered from the returned air from the treatment chamber prior to temperature control.

If substances are added to the feed air towards the treatment chamber, a broad spectrum of maturing treatments, in particular of foodstuffs, may be performed. These additional substances may comprise, for example, liquid smoke, inert gases etc.

In the following description the invention is to be elucidated in more detail by way of preferred working examples with reference to the figures in the accompanying drawing.

In this context.

Figure 1:
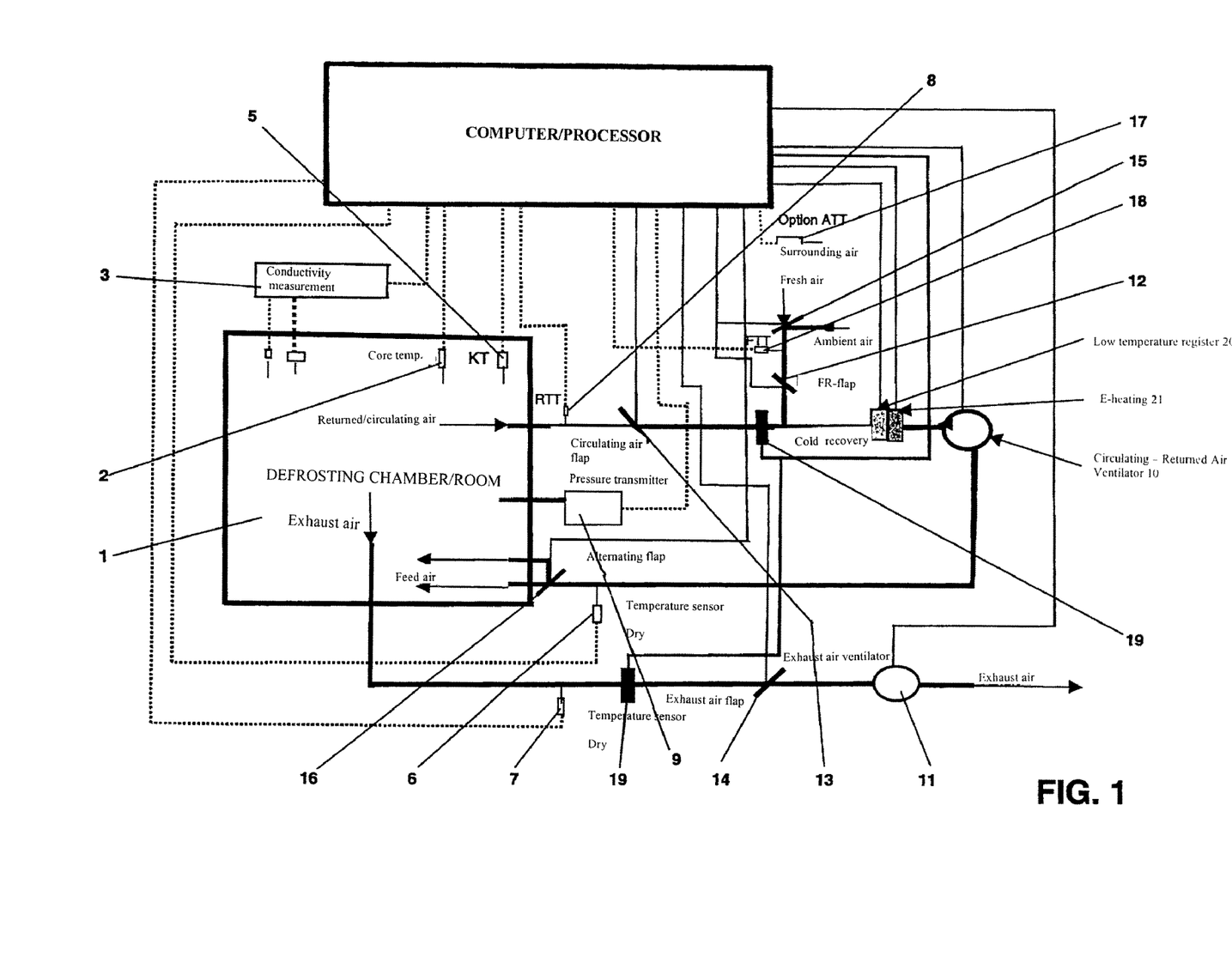
FIG. 1 shows a schematic representation of an example of a defrosting plant using the method according to the invention.

A hermetically sealed treatment chamber 1 contains deep-frozen products, for example for a defrosting process, which are to be defrosted to a predefined final core temperature. The core temperature of the product and its water content are determined by a temperature sensor 2 and a device 3 for measuring conductivity and are transmitted to the control means 4. Further temperature sensors 5, 6, 7, 8 measure the temperature of the air inside the drying chamber and the temperature of the feed air, the exhaust air and the returned or circulating air. Advantageously, the pressure in the drying chamber 1 as well is monitored by means of a pressure transmitter 9.

Figure 2:
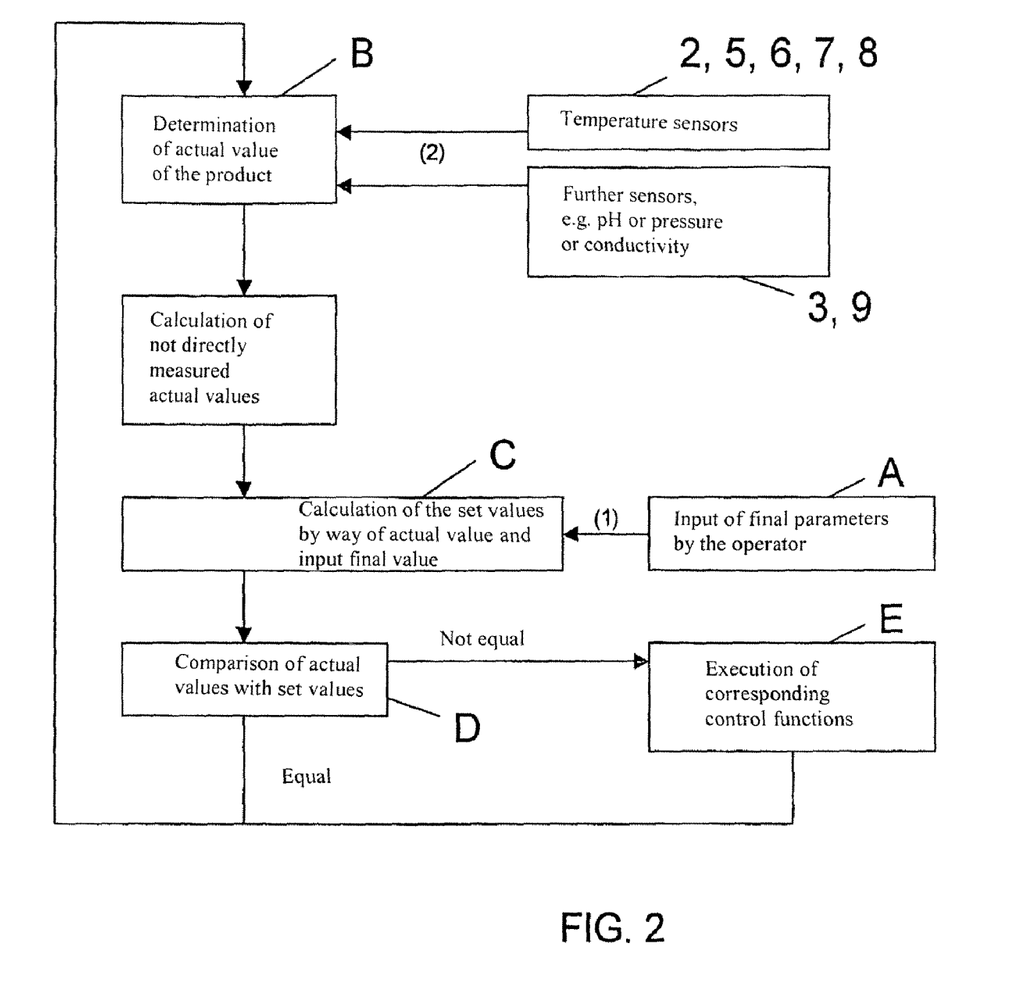
FIG. 2 is a flow chart of the control method according to the invention.

In a first step A, as clearly illustrated in the flow chart according to FIG. 2, at least once at the beginning of the treatment process the desired final state of the product is defined by way of characteristic parameters. Furthermore, in a further step B which may be performed prior to, simultaneously with or even after step A, set values, resulting from the parameters measured by the sensors 2 to 9 and defined in step A are automatically determined in a further step C for the measured parameters for the next cycle and are compared with the respective actual values in the next measuring cycle and the process step D. In the control means 4 a software algorithm has been realized, which converts all variable physical calculations in a control process and which, in the event of a deviation of actual and set values, selects controlling means in a further step E thereby creating the required environment for the product for a gentle and energy-optimal treatment process. After adjusting the control means, but also in the event of matching actual and set values the control loop starts afresh at step B by determining the actual values of the product, repeating itself until the desired final state of the set values of the characteristic parameters has been attained.

In order to control the environmental parameters for gently defrosting the products in the treatment chamber 1, a frequency-controlled ventilator 10 for bringing about a return or circulating flow and a frequency-controlled exhaust air ventilator 11 are controlled via the control means 4, determining, in conjunction with a fresh air flap 12, a circulating air flap 13, an exhaust air flap 14, an external air/ambient air flap 15, as well as—in larger sized plants—with an additional alternating flap 16, the environmental air density for the inlet air into the treatment chamber 1 as well as the humidity in the treatment chamber 1. In this context, the automatic calculation of the water content of the core (determined by the means 3 on the basis of the conductivity) contributes to the control of the process, the predetermined final parameters determining the time corridor and the technical plant applying all controls, depending on requirements. Preferably, temperature sensors 17, 18 may in addition be provided for the external air and the fresh air.

Since from the adaptation of the circulating air density and quantity, the amounts of fresh air and of exhaust air, brought about by way of the algorithm in the control means 4, taking into consideration the actual value and the set value of the degree of drying, in conjunction with the respective, predetermined core temperature as well as actual temperature and set temperature, the given and calculated vapor saturation in the feed air, the circulating air and the exhaust air contributes as well, a constantly controlled product environment air density with a saturation of the product environment humidity is maintained, through which the product to be defrosted can eliminate the cold in an optimal quantity, starting from the core and extending to the edge of the product, the biological limits of releasing cold without the loss of product water being taken into account. The external measuring point devices required therefore are selected according to the product and are integrated in the software algorithm.

The actual temperature transfer may take place in one or a plurality of means 19 for the recovery of cold, so that a separate low temperature register 20 may be operated economically or may be dispensed with altogether. The specific addition of fresh air or ambient air, in turn, may contribute to a lower heating output requirement by the heating means 21, in order to set the temperature of the feed air to the required value.

The technical dimensions of ventilators, air ducts, heating, refrigeration etc. depend only on the respective capacity and the specific properties of the products to be treated, actually having no serious effect on the process control technique and being so selected that a good degree of efficiency is attained. In contrast to conventional installations, up to 50% of energy input rating savings as well as up to 70% of operational energy savings may in this way be attained.

Figure 3:
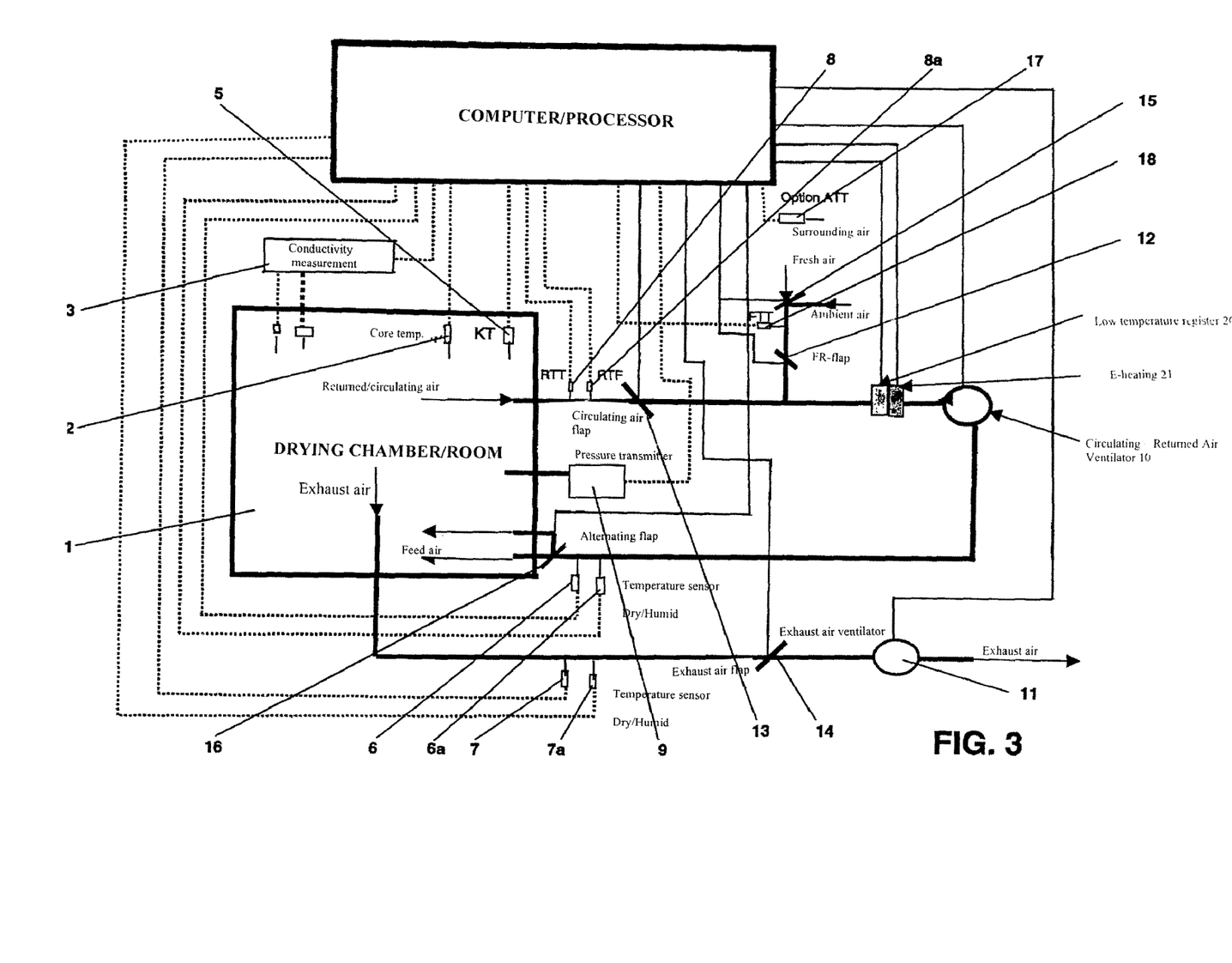
FIG. 3 is a schematic representation of an example of a drying plant, operated according to the method according to the invention.

For the installation shown in FIG. 3 the control method may be expanded further and may thus be optimized in particular for the gentle and energy-efficient drying of products, for example wood. By means of additional temperature sensors 6a, 7a, 8a, in combination with the temperature sensors 6, 7 and 8, the humidity of the feed, returned and exhaust air, in addition to the temperature, is measured as well. These measured humidity values and, if need be, further calculated values determined by using the latter, also contribute advantageously to the control algorithm in the control means 4, affording the product the required environment for a gentle and energy-optimal drying process.

Since from the adaptation of the circulating air density and quantity, the amounts of fresh air and exhaust air, brought about by way of the algorithm in the control means 4, taking into consideration the actual value and the set value of the degree of drying, in conjunction with the respective, predetermined core temperature as well as actual temperature and set temperature, the given and calculated vapor saturation in the feed air, the circulating air and the exhaust air contributes as well, a constantly controlled product environment air density with the correspondingly calculated saturation is maintained, making it possible for the product to release water gently, starting from the core and extending to the edge of the product. The actual water discharge from the returned air takes place by the pressure reduction of the air (condensation). The low temperature register 20 may thus likewise be operated economically or may be dispensed with altogether, just as by the specific addition of fresh air or ambient air a lower heating output by the heating means 21 is required, in order to maintain the feed air at the set temperature.

The control method according to the invention permits any type of wood to be dried, for example, to be controlled with percentage accuracy with regard to water discharge and over a product-specific period of time. The external measuring point devices required therefore are selected as a function of the product and are integrated in the software algorithm.

Figure 4:
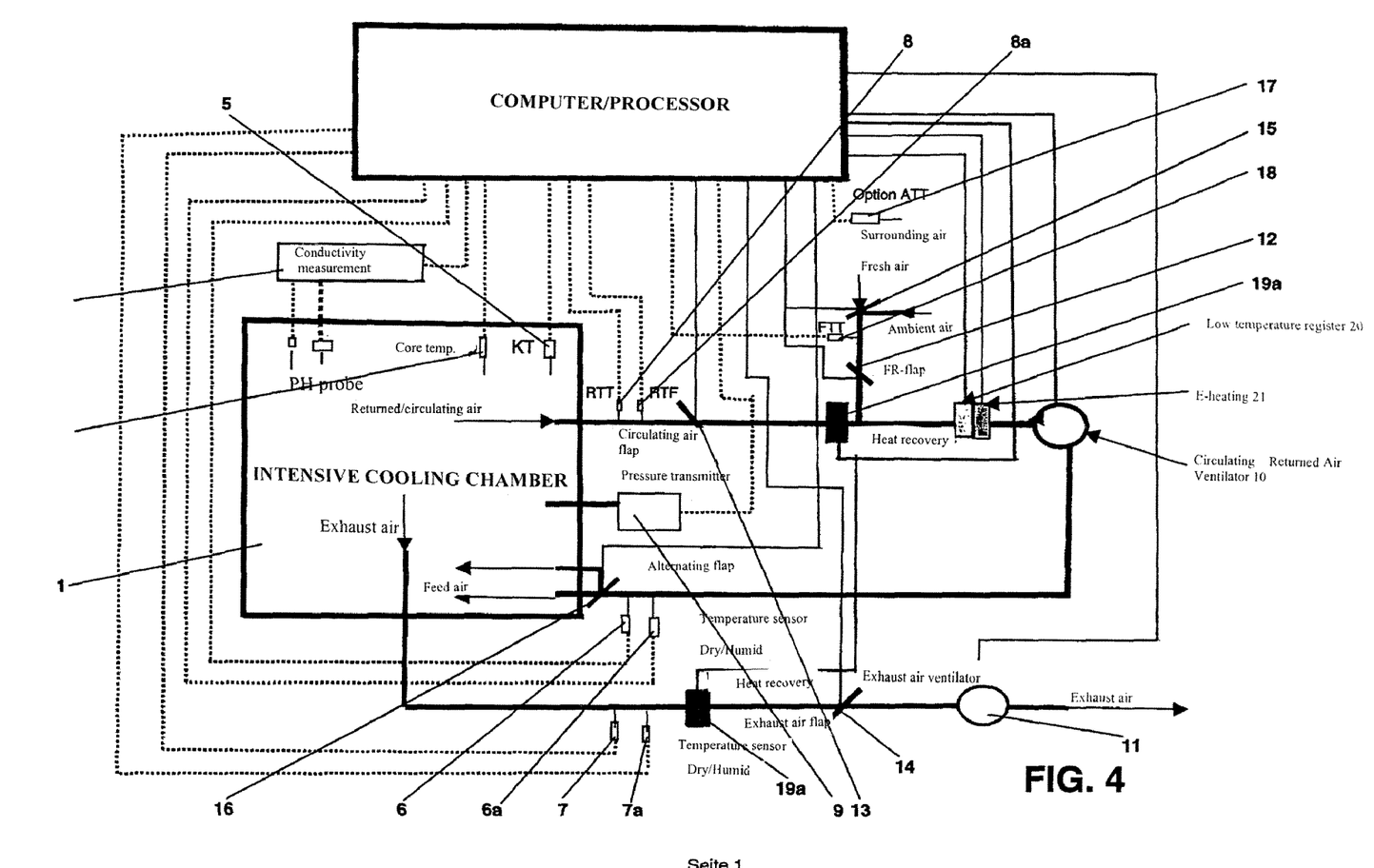
FIG. 4 shows a schematic illustration of an intensive cooling plant for carrying out the method according to the invention and FIG. 5 is an illustration of a maturing chamber, likewise operated by using the method according to the invention.

For a gentle intensive cooling of high temperature products, in which the biological limits of the heat emission without loss of product water should not be exceeded and which treatment should also be performed in an energy-saving manner, an installation as shown in FIG. 4 is operated by using the control method according to the invention.

Again, the coordination of the circulating air density and quantity, the fresh air quantity and exhaust air quantity, takes place in the control means 4 by means of the algorithm, under consideration of the actual value and the set value of the degree of drying, in conjunction with the respective, predetermined core temperature as well as the actual temperature and set temperature. Likewise, the given and calculated vapor saturation in the feed air, the circulating air and the exhaust air contributes as well, by which the optimal, but nevertheless gentle heat emission is performed by maintaining a continuously controlled product environment air density with the correspondingly calculated saturation.

The temperature transfer from the returned air takes place initially via one or a plurality of means 19a for heat recovery. As a result, the low temperature register 20 may likewise be operated in an economical manner or may be dispensed with altogether, just as by the specific addition of fresh air or ambient air a lower heating output by the heating means 21 is required, in order to maintain the feed air at the set temperature.

Figure 5:
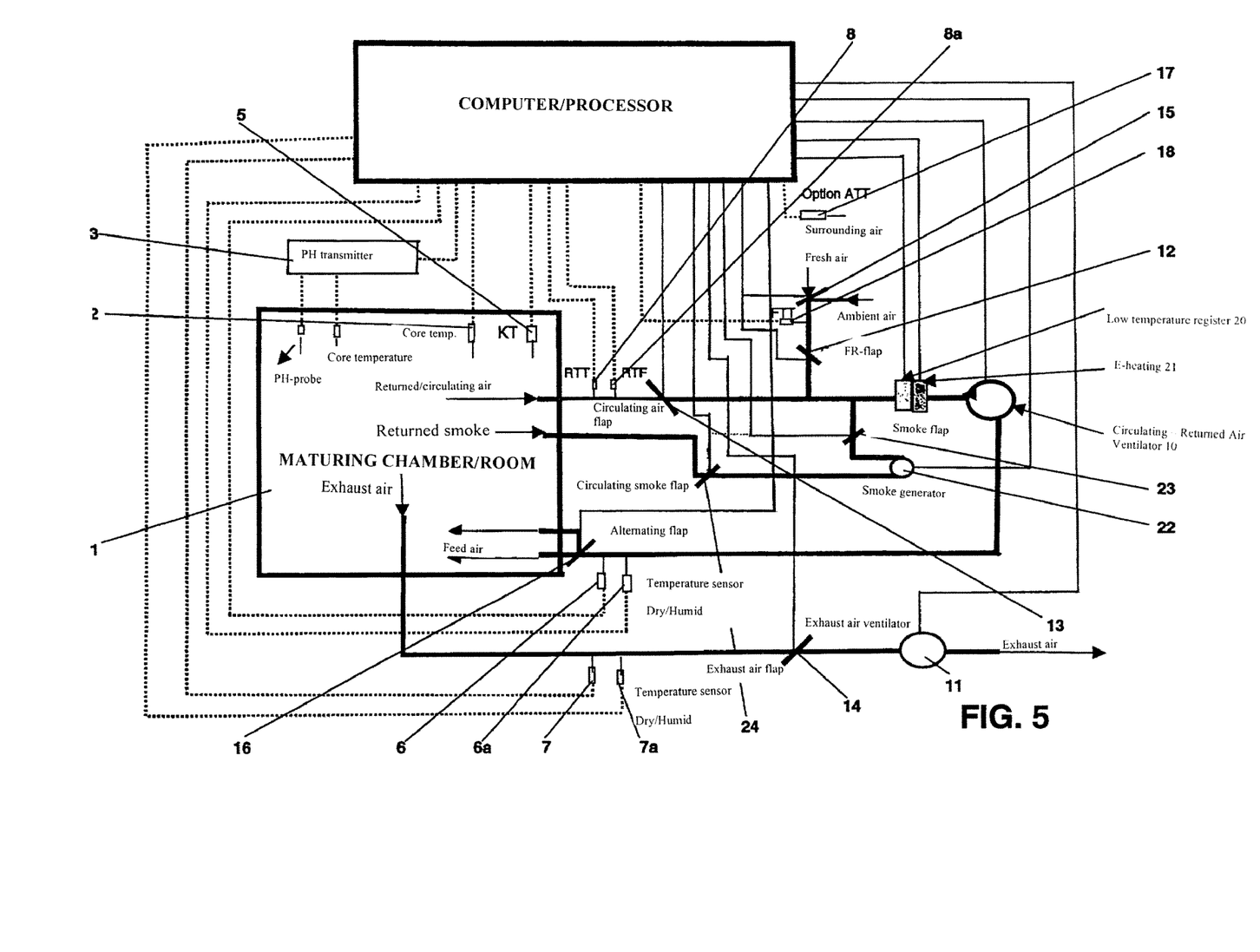

Apart from the installation and control features already elucidated above, further additional precautions may be taken for the maturing treatment of foodstuffs, so that the smoking phases for smoking certain products may be integrated in a drying process in such a manner that the smoky taste is transported to the core even without additional water absorption of the product and the products only exhibit this biological-physical behavior at the end of the drying process. For this purpose, a smoke generator 22, for example, is provided, as shown in FIG. 5 and, together with a smoke flap 23 as well as a circulating smoke flap 24 is integrated into the control algorithm.

In the course of the maturing treatment of foodstuffs, advantageously by the influence of the software algorithm, an acidification is also counteracted by defining a minimum pH value. However, the release of acid takes place in conjunction with water, attaining thereby the desired degree of maturing of a firm raw sausage, the actual pH value as well as the set pH value controlling the loss of water content. Due to the product-optimal control of the method a reduction of the drying time of up to 30% was achieved thereby, the products not exhibiting any substances presenting a bio-bacterial hazard, the drying yielding a uniform residual water content from the core to the edge, the natural reddening starting from the core to the edge, as well as the binding of the tissues coming about, the smoking phases having been integrated on a shortened basis in the case of absorptive product characteristics, which in turn yield better taste at a lower tar content, the technological final parameters corresponding to the norms.

The invention claimed is:

1. A control method for the air-conditioned treatment of products through a treatment process, the method comprising the steps of:
   (a) measuring a characteristic temperature of the product cyclically at definable time intervals;
   (b) adjusting at least one environmental parameter in a treatment chamber according to the measured characteristic temperature;
   (c) measuring in each cycle actual values for the characteristic temperature of the product, the temperature of the air inside the treatment chamber, the temperature of feed air entering the treatment chamber, and the moisture content of the product;
   (d) defining a desired final state of the product by way of characteristic parameters, the desired final state being defined at least at the beginning the treatment process;
   (e) determining set values for the measured parameters of step (c) for a next cycle, the set values being determined from the measured parameters of step (c) and the defined parameters of step (d) for the next cycle, the set values being defined automatically;
   (f) comparing the set values with respective actual values in the next measuring cycle;
   (g) adjusting at least one environmental parameter in the treatment chamber to create the desired final state of the product; and
   (h) determining if the set values and the actual values in step (f) are equal, wherein if the values are equal then repeating steps (e)-(h) until the desired final state of the set values of the characteristic parameters has been attained.

2. The control method according to claim 1 further comprising the step of deriving actual parameters determined from the actual values for the characteristic temperature of the product, the temperature of the air inside the treatment chamber, the temperature of the feed air, and the moisture content of the product, and that from several measured and derived parameters as well as from the defined parameters set values are automatically determined for these measured and derived parameters for the next cycle and are compared with the respective actual values in the next measure cycle.

3. The control method according to claim 2 further comprising the step of measuring the humidity of the feed and exhaust air of the treatment chamber, and that the latter set values for the next cycle automatically determined and compared with the respective actual values in the next measuring cycle.

4. The control method according to claim 3 further comprising the step of determining further derived actual parameters from the humidity of the feed and exhaust air and that for the latter set values for the next cycle are also automatically determined and compared with the respective actual value in the next measuring cycle.

5. The control method according to claim 4 further comprising the step of adjusting the air pressure inside the treatment chamber.

6. The control method according to claim 5 further comprising the step of adjusting the vapor pressure of the air inside the treatment chamber.

7. The control method according to claim 6, wherein the moisture content at least of the product is determined according to its conductivity.

8. The control method according to claim 7 further comprising the step of adjusting returned air from the treatment chamber.

9. The control method according to claim 8 further comprising the step of recovering heat or cold from the returned air from the treatment chamber prior to temperature control.

10. The control method according to claim 9 further comprising the step of adding substances to the feed air towards the treatment chamber.

11. A control method for the air-conditioned treatment of products through a treatment process, the method comprising the steps of:
(a) measuring a characteristic temperature of the product cyclically at definable time intervals;
(b) adjusting at least one environmental parameter in a treatment chamber according to the measured characteristic temperature;
(c) measuring in each cycle actual values for the characteristic temperature of the product, the temperature of the air inside the treatment chamber, the temperature of feed air entering the treatment chamber, and the moisture content of the product, wherein the moisture content at least of the product is determined according to its conductivity;
(d) measuring the humidity of the feed and exhaust air of the treatment chamber;
(e) defining a desired final state of the product by way of characteristic parameters, the desired final state being defined at least at the beginning the treatment process;
(f) determining set values for the measured parameters of step (c) for a next cycle, the set values being determined from the measured parameters of step (c) and the defined parameters of step (d) for the next cycle, the set values being defined automatically;
(g) comparing the set values with respective actual values in the next measuring cycle;
(h) adjusting at least one environmental parameter in the treatment chamber to create the desired final state of the product; and
(i) determining if the set values and the actual values in step (g) are equal, wherein if the values are equal then repeating steps (c)-(i) until the desired final state of the set values of the characteristic parameters has been attained.

12. The control method according to claim 11 further comprising the step of deriving actual parameters determined from the actual values for the characteristic temperature of the product, the temperature of the air inside the treatment chamber, the temperature of the feed air, and the moisture content of the product, and that from several measured and derived parameters as well as from the defined parameters set values are automatically determined for these measured and derived parameters for the next cycle and are compared with the respective actual values in the next measure cycle.

13. The control method according to claim 11 further comprising the step of determining further derived actual parameters from the humidity of the feed and exhaust air and that for the latter set values for the next cycle are also automatically determined and compared with the respective actual value in the next measuring cycle.

14. The control method according to claim 13 further comprising the step of adjusting the air pressure inside the treatment chamber.

15. The control method according to claim 14 further comprising the step of adjusting the vapor pressure of the air inside the treatment chamber.

16. The control method according to claim 15 further comprising the step of adjusting returned air from the treatment chamber.

17. The control method according to claim 16 further comprising the step of recovering heat or cold from the returned air from the treatment chamber prior to temperature control.

18. The control method according to claim 17 further comprising the step of adding substances to the feed air towards the treatment chamber.

19. A control method for the air-conditioned treatment of products through a treatment process, the method comprising the steps of:
(a) providing a treatment chamber, multiple temperature sensors, a product conductivity measuring device, at least one pressure sensor, a control means; a frequency-controlled ventilator for bringing about a return or circulating flow, a frequency-controlled exhaust air ventilator, a fresh air flap, a circulating air flap, an exhaust air flap, and an external air/ambient air flap;
(b) measuring a characteristic temperature of the product cyclically at definable time intervals;
(c) adjusting at least one environmental parameter in a treatment chamber according to the measured characteristic temperature;
(d) measuring in each cycle actual values for the characteristic temperature of the product, the temperature of the air inside the treatment chamber, the temperature of feed air entering the treatment chamber, and the moisture content of the product, wherein the moisture content at least of the product is determined according to its conductivity;
(e) defining a desired final state of the product by way of characteristic parameters, the desired final state being defined at least at the beginning the treatment process;
(f) determining set values for the measured parameters of step (d) for a next cycle, the set values being determined from the measured parameters of step (d) and the defined parameters of step (e) for the next cycle, the set values being defined automatically;
(g) comparing the set values with respective actual values in the next measuring cycle;
(h) adjusting at least one environmental parameter in the treatment chamber to create the desired final state of the product; and
(i) determining if the set values and the actual values in step (g) are equal, wherein if the values are equal then repeating steps (f)-(i) until the desired final state of the set values of the characteristic parameters has been attained.

* * * * *